United States Patent
Loehnert (10) Patent No.: US 10,335,965 B2
(45) Date of Patent: Jul. 2, 2019

(54) KNIFE HAVING AN RFID TRANSPONDER ARRANGED ON THE TANG

(71) Applicant: Friedr. Dick GmbH & Co. KG, Deizisau (DE)

(72) Inventor: Horst Loehnert, Ostfildern (DE)

(73) Assignee: FRIEDR. DICK GMBH & CO. KG, Deizisau (DE)

( * ) Notice: Subject to any disclaimer, the term of this patent is extended or adjusted under 35 U.S.C. 154(b) by 41 days.

(21) Appl. No.: 15/084,476

(22) Filed: Mar. 30, 2016

(65) Prior Publication Data

US 2016/0221198 A1 Aug. 4, 2016

Related U.S. Application Data (63) Continuation of application No. PCT/EP2014/069319, filed on Sep. 10, 2014.

(30) Foreign Application Priority Data

Oct. 1, 2013 (DE) ........................ 10 2013 219 875

(51) Int. Cl.
*G06K 19/06* (2006.01)
*B26B 11/00* (2006.01)
*B26B 3/00* (2006.01)
*G06K 19/077* (2006.01)

(52) U.S. Cl.
CPC .............. *B26B 11/008* (2013.01); *B26B 3/00* (2013.01); *G06K 19/07758* (2013.01)

(58) Field of Classification Search
CPC ...... A61B 90/98; A61B 90/90; G06K 19/005; G06K 19/04; G06K 19/077; G06K 19/07758; G06K 9/00624; G06K 9/00664; G06K 2209/17; G06K 9/00335; G06K 9/00342; G06K 9/00771; G08B 13/2434;
(Continued)

(56) References Cited

U.S. PATENT DOCUMENTS

| 6,366,206 B1* | 4/2002 | Ishikawa .............. G06K 19/077 340/572.1 |
| 2006/0186210 A1* | 8/2006 | Tethrake .............. G06K 19/005 235/492 |

(Continued)

FOREIGN PATENT DOCUMENTS

| DE | 10 2006 012 070 A1 | 9/2007 |
| DE | 20 2006 008 789 U1 | 11/2007 |
| DE | 10 2006 032 150 A1 | 1/2008 |

(Continued)

*Primary Examiner* — Thien T Mai
(74) *Attorney, Agent, or Firm* — Hackler Daghighian Martino & Novak (57) ABSTRACT

A knife includes a knife blade having a tang and an RFID transponder which is fixed to the tang. A knife handle surrounds the tang and the RFID transponder. The knife blade is produced from metal, in particular steel. The RFID transponder has an antenna and at least a portion of the antenna of the RFID transponder is constructed in a planar manner and is arranged parallel with a planar lateral face of the tang. In another embodiment, the antenna of the RFID transponder is galvanically connected to the tang. The knife having the RFID transponder increases the reliability of the reading by an RFID reading device.

21 Claims, 7 Drawing Sheets

(58) Field of Classification Search
CPC ......... B26B 21/14; B26B 21/40; B26B 21/50; B26B 25/002
See application file for complete search history.

(56) References Cited

U.S. PATENT DOCUMENTS

2007/0244470 A1* 10/2007 Barker, Jr. ............. A61B 90/90
                                                        606/1
2013/0223045 A1* 8/2013 Cammenga ........... B26B 11/008
                                                      362/119

FOREIGN PATENT DOCUMENTS

| DE | 10 2008 026 678 A1 | 12/2009 |
|---|---|---|
| DE | 20 2007 019 033 U1 | 5/2010 |
| EP | 2 043 826 B1 | 4/2009 |
| WO | 01 42991 A1 | 6/2001 |
| WO | 2005 108183 A1 | 11/2005 |
| WO | 2009 146677 A1 | 12/2009 |

* cited by examiner

KNIFE HAVING AN RFID TRANSPONDER ARRANGED ON THE TANG

CROSS-REFERENCE TO RELATED APPLICATIONS

This continuation application claims priority to PCT/EP2014/069319 filed on Sep. 10, 2014 which has published as WO 2015/049096 A1 and also the German application number 10 2013 219 875.2 filed on Oct. 1, 2013, the entire contents of which are fully incorporated herein with these references.

DESCRIPTION

Field of the Invention

The present invention relates to a knife comprising a knife blade having a tang, an RFID transponder which is fixed to the tang, and a knife handle which surrounds the tang and the RFID transponder.

Background of the Invention

Such a knife is known from WO 01/42991 A1.

During the processing of food products, in particular meat and fish processing, or also fruit and vegetable processing, cleanliness and hygiene are very important. Typically, the food products are processed under conditions which are as free from germs and dirt as possible. If germs nevertheless spread during the processing of the food products too extensively, they can cause serious damage to health in consumers of the food products.

In businesses which process food products, knives are in particular used in various manners in order to prepare the food products for consumption or for further processing. The knives come into contact with a large number of successively processed food products and must therefore be cleaned regularly in order to prevent the introduction of germs into whole batches of food products.

With an RFID transponder (RFID: Radio Frequency Identification) on a knife, the regular cleaning of the knife can be checked. RFID reading devices are installed for this purpose in cleaning stations and knives which are overdue for cleaning can be identified in that a knife which can be identified by means of its RFID transponder has not been read by a reading device at a cleaning station up to a set time. Where necessary, information messages can remind an operator to carry out a prescribed cleaning operation. Furthermore, transport of knives into hygienically unsafe areas can readily be discovered by RFID reading devices in monitored room entrances or room exits, cf. in this regard WO 01/42991 A1.

The reliability of the monitoring of the circulation of knives by means of RFID is dependent on the reliability of the reading of the RFID transponder on the knives by the RFID reading devices. If a knife is not read reliably, for example, at a room exit or at a cleaning station, the hygiene cannot be ensured in a business which processes food products.

WO 01/42991 A1 discloses the introduction of a cylindrical RFID transponder into an opening in the tang of a knife so that the cylindrical transponder is orientated perpendicularly to the lateral faces of the tang. The tang with the RFID transponder is overmolded with a plastics material in order to produce the knife handle.

EP 2043826 B1 describes a knife having an RFID transponder, wherein a transponder is fixed to the tang via a spacer element of plastics material at an end of the tang remote from the blade. A handle of the knife is produced by overmolding of the tang together with the spacer element and the transponder.

WO 2005/108183 A1 also discloses the bonding of an RFID transponder to a knife or the introduction of an RFID transponder into the handle of the knife.

An object of the invention is to provide a knife having an RFID transponder, wherein the reliability of the reading by an RFID reading device is increased.

SUMMARY OF THE INVENTION

This object is achieved by a knife of the type mentioned in the introduction which is characterized in that the knife blade is produced from metal, in particular steel, in that the RFID transponder has an antenna, and in that at least a portion of the antenna of the RFID transponder is constructed in a planar manner and is arranged parallel with a planar lateral face of the tang.

This object is also achieved by a knife of the type mentioned in the introduction which is characterized in that the knife blade is produced from metal, in particular steel, in that the RFID transponder has an antenna, and in that the antenna of the RFID transponder is galvanically connected to the tang.

The present invention proposes the integration of the knife blade and the continuation thereof which extends in a handle of a knife according to the invention, that is to say, the tang, in the antenna function of the RFID transponder. It is thereby generally possible to achieve a substantially more reliable reading of the RFID transponder. The knife blade is produced from electrically conductive metal and can therefore make electrical currents, which are induced in the knife blade during the introduction of high-frequency pulses by an RFID reading device, better able to be used for the RFID transponder. Similarly, the knife blade can be made usable for radiating high-frequency pulses which are produced by the RFID transponder as a response to irradiated high-frequency pulses.

In a first variant thereof, the invention provides for the electromagnetic coupling of the antenna to the tang as a result of the arrangement of at least one planar portion of the antenna of the RFID transponder parallel with and on or in front of a planar lateral face of the tang. The at least one planar portion of the antenna overlaps in a manner of speaking the tang. In this instance, the antenna is typically spaced apart from the lateral face of the tang at least in the mentioned portion, preferably by a maximum of two millimeters, particularly preferably by a maximum of one millimeter, and usually approximately from 0.1 to 0.3 mm (for example, by a layer-like dielectric carrier) so that the antenna and the tang are galvanically separated from each other (electrically insulated from each other). The parallel orientation and the small spacing by the fixing of the RFID transponder directly to the tang ensure good electromagnetic coupling properties.

In a second variant thereof, the invention provides for the galvanic connection of the antenna of the transponder to the tang. In other words, there is produced an ohmic connection between the antenna of the RFID transponder and the tang. It is thereby possible to directly integrate the tang in the antenna function of the RFID chip. In this instance, there are generally produced only one or two soldering contacts between the antenna and the tang, or the antenna is positioned with a portion directly on the tang.

The RFID transponder is preferably constructed in a passive manner in the context of the invention and the antenna typically comprises two antenna portions which are connected to a chip of the RFID transponder which supplies the desired RF communication and which generally contains a code for unambiguous identification of the knife; however, the chip may also contain other information alternatively or additionally.

Preferred embodiments of the invention are described herein below.

Embodiments for galvanic coupling:

In a preferred embodiment of the knife according to the invention with galvanic connection between the transponder antenna and tang, there is provision for the antenna of the RFID transponder to have two mutually galvanically separated antenna portions, and for only one of the antenna portions to be galvanically connected to the tang, in particular wherein the antenna portions have a different capacitance and/or inductivity. In this configuration, the tang or the knife blade can be integrated in the antenna function particularly efficiently; the tang in a manner of speaking extends one of the antenna portions which are galvanically separated from each other. It should be noted that the antenna portion which is galvanically connected to the tang may be very small and, for example, only comprises a short conductor piece which connects the tang to a chip of the RFID transponder. The two antenna portions are considered to be galvanically separated from each other when they (except for via the chip which connects them, where applicable) do not have an ohmic connection to each other. As a result of the different capacitance and/or inductivity of the antenna portions, the antenna can generally be adapted to the properties of the tang or the knife blade so that the antenna with the knife blade is adapted to a desired high frequency.

An embodiment of the knife according to the invention with a galvanic connection between the transponder antenna and the tang is also advantageous, wherein at least a portion of the antenna of the RFID transponder is constructed in a planar manner and is arranged parallel with a planar lateral face of the tang. It is thereby possible to readily use additional electromagnetic coupling effects between the portion of the antenna and the tang (cf. first variant above); the galvanic connection generally comprises here only one or two soldering contacts.

Embodiments for parallel arrangement of a planar antenna portion and a planar lateral face of the tang:

In a preferred embodiment of a knife according to the invention, in which at least a portion of the antenna is constructed in a planar manner and is arranged parallel with a planar lateral face of the tang, there is provision for the at least one planar portion of the antenna which is arranged parallel with the planar lateral face of the tang to be arranged in front of the planar lateral face with a spacing of a maximum of 2 mm, preferably a maximum of 1 mm. As a result of that spatial proximity, generally very good electromagnetic couplings can be achieved between the antenna and the tang. In order to adjust a defined spacing and to achieve an electrical insulation between the antenna portion and the tang, there is generally provided a layer-like, dielectric carrier or a plastics film between the planar portion of the antenna and the tang.

General Embodiments:

An embodiment of a knife according to the invention is further preferred, wherein the tang has one or more perforations which are engaged over by the antenna of the RFID transponder. It is thereby possible for high-frequency radiation to reach the antenna through the perforations and thus to reduce shielding effects of the tang in order to increase the reliability of a reading of the RFID transponder.

In a preferred embodiment, all the portions of the antenna of the RFID transponder are constructed in a planar manner and arranged parallel with a planar lateral face of the tang. This, on the one hand, is mechanically particularly simple and robust to produce and, on the other hand, it also allows electromagnetic coupling of the antenna to the tang via a maximum antenna surface or conductor length.

A development of this embodiment is advantageous, wherein two portions of the antenna are arranged at mutually opposing planar lateral faces of the tang. In this case, a chip which connects the two portions of the antenna is typically arranged at a narrow side of the tang. In this embodiment, shielding effects as a result of the tang are particularly small and practically any orientations of the knife can be read very well with an RFID reading device.

In an alternative development of the above embodiment, all the portions of the antenna are arranged at the same planar lateral face of the tang. This is mechanically simple and particularly robust. It should be noted that the antenna in this case is constructed in a completely planar manner.

Another embodiment is particularly preferred, wherein at least a portion of the antenna of the RFID transponder projects beyond the tang, in particular at a rear end of the tang facing away from a cutting edge of the knife blade. This portion of the antenna is practically unaffected by shielding effects (shadowing effects) of the conductive tang so that in this embodiment a particularly reliable reading of the transponder of the knife is possible. It should be noted that the antenna in this embodiment is typically also constructed in a completely planar manner.

In an advantageous embodiment, an additional metal substrate, in particular a metal foil or a metal plate, is provided with regard to the tang and engages under at least a portion of the antenna of the RFID transponder. High-frequency radiation can selectively be reflected to the antenna or away from the metal substrate by means of the metal substrate, whereby RFID reading processes can be simplified. Since the metal substrate is independent of the tang, a desirable reflection behavior can be configured substantially without regard for the precise position of the RFID transponder on the tang. The metal substrate is generally initially connected to the RFID transponder and that assembly is subsequently fixed to the tang.

A preferred development of this embodiment makes provision for the additional metal substrate to engage under a portion of the antenna which projects beyond the tang. A guiding or orientation of high-frequency radiation can thereby be selectively configured in a region where the tang is not available for a reflection of high-frequency radiation.

In an advantageous development, the additional metal substrate is galvanically connected to the tang. The metal substrate can thereby be integrated in the antenna function of the RFID transponder similarly to the tang. Alternatively, the additional metal substrate is galvanically separated from the tang (electrically insulated), in particular in order to configure a separate adjustment element for adjusting the antenna to a desired frequency.

An embodiment is particularly preferred, wherein the antenna is arranged on a layer-like, dielectric carrier. An inadvertent short-circuit between the antenna and the tang can thereby be prevented. Furthermore, the inductive and/or capacitive coupling between the antenna and the tang can be precisely adjusted. A typical thickness of the dielectric (insulating) carrier is from 0.1 mm to 2 mm.

The scope of the present invention also includes a method for producing a knife, in particular a knife according to the invention having a planar antenna portion which abuts a planar lateral face of the tang, having the following steps:

a) fixing an RFID transponder to a tang, wherein at least a planar portion of an antenna of the RFID transponder is arranged parallel with a planar lateral face of the tang; and b) producing a knife handle by the tang and the RFID transponder being overmolded or cast-in with a plastics material, in particular using the injection-molding method. This is a simple method to produce a knife having improved reliability during reading of the RFID transponder. In particular, the handle can be produced in one step (with only one overmolding or casting-in process).

The scope of the present invention also includes a method for producing a knife, in particular a knife according to the invention having a galvanic connection between the antenna and the tang, having the following steps:

a) fixing an RFID transponder to a tang, wherein an antenna of the RFID transponder is galvanically connected to the tang; and b) producing a knife handle by the tang and the RFID transponder being overmolded or cast-in with a plastics material, in particular using the injection-molding method. This method ensures a direct integration of the tang or the knife blade in the antenna function, whereby an improved reliability during reading of the RFID transponder can also be achieved. The handle can also be produced in one step here (with only one overmolding or casting-in process).

In a preferred variant of the last method mentioned, in step a), a soldering contact is produced between the antenna and the tang. A soldering contact ensures in a simple and reliable manner a galvanic (ohmically conductive) connection.

Another variant of the last method mentioned makes provision for, in step a), a portion of the antenna to be placed directly on the tang and for the portion of the antenna and the tang to be pressed together by heating a ripple-finish paint or heat-shrinkable sleeve which surrounds the portion of the antenna and the tang. It is thereby also possible to reliably produce a galvanic connection between the tang and the antenna, wherein soldering is unnecessary. The temperatures at which a ripple-finish paint or heat-shrinkable sleeve contracts are far lower than typical soldering temperatures so that the procedure in this variant can protect any temperature-sensitive elements (for instance, a dielectric carrier).

In another variant of the methods according to the invention, in step a), the RFID transponder is adhesively bonded to the tang. A desired (correct) positioning of the RFID transponder on the tang during the subsequent production method, in particular an overmolding or casting step, is thereby readily ensured.

Additional advantages of the invention will be appreciated from the description and the drawings. The above-mentioned features and those set out below can also be used according to the invention individually per se or together in any combination. The embodiments shown and described are not intended to be understood to be a conclusive listing but are instead of exemplary character for the description of the invention.

BRIEF DESCRIPTION OF THE DRAWINGS

The invention is illustrated in the drawings and is explained in greater detail with reference to embodiments. In the drawings.

DETAILED DESCRIPTION OF THE PREFERRED EMBODIMENTS

FIGS. 1a to 1d illustrate a variant of a production according to the invention of an embodiment of a knife according to the invention, wherein at least a portion of the antenna of an RFID transponder is constructed in a planar manner and is arranged on a planar lateral face of the tang.

Figure 1A:
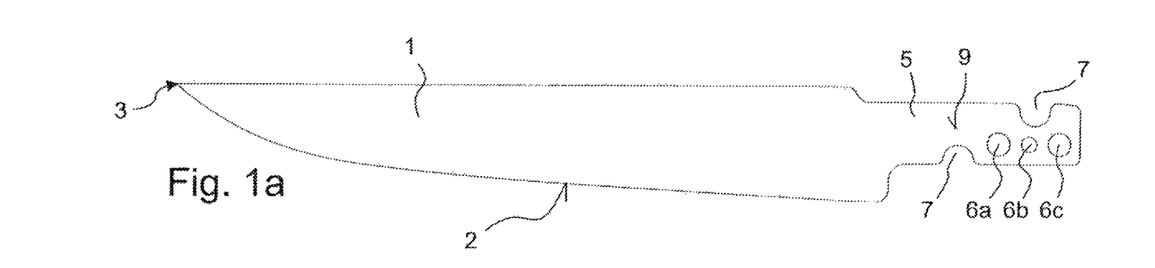
FIG. 1a is a schematic side view of a knife blade with a tang for a knife according to the invention; wherein the tang has perforations.

FIG. 1a shows a knife blade 1 for the knife according to the invention. The knife blade 1 has a cutting edge 2 and also a tip 3 in this case; it should be noted that the front end of the knife blade 1 can also be constructed to be rounded (not illustrated) and the knife blade 1 can also be constructed to have two cutting edges (not illustrated). At the rear end of the knife blade 1 there is constructed a tang 5 which is arranged in the complete knife inside a knife handle (cf. in this regard FIG. 1e below). The knife blade 1, including the tang 5, is produced from an electrically conductive metal, in particular rust-resistant high-grade steel. In the embodiment shown, the tang 5 has a plurality of perforations (throughholes) 6a, 6b, 6c. Furthermore, there are provided in the tang 5 notches 7 which can be used for the handling of the tang 5 by machine.

Figure 1B:
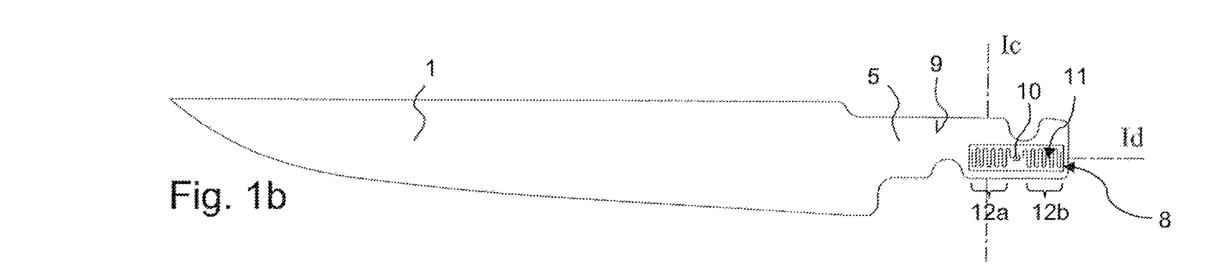
FIG. 1b shows the knife blade from FIG. 1a, with an RFID transponder which is completely fixed to a planar lateral face of the tang.

In the variant shown, an RFID transponder 8 is subsequently fixed to a planar lateral face 9 of the tang 5, in particular adhesively bonded, cf. FIG. 1b. The RFID transponder 8 has a chip 10 and a two-portion antenna 11 having meandering conductors which extend in a plane in this instance. In the example shown, the first portion 12a (on the left in FIG. 1b) of the antenna 11 and the second portion 12b (on the right in FIG. 1b) of the antenna 11 are constructed in a mirror-symmetrical manner; both portions 12a, 12b are connected to the chip 10, but are otherwise galvanically separated from each other.

Figure 1C:
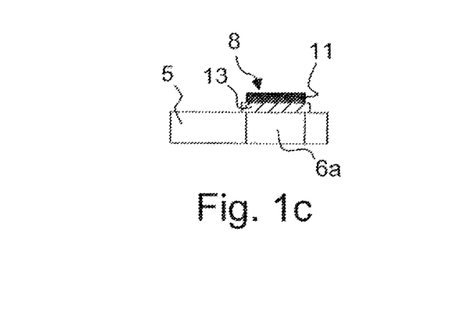
FIG. 1c is a schematic cross-section through the knife blade of FIG. 1b in the plane of section Ic.
Figure 1D:
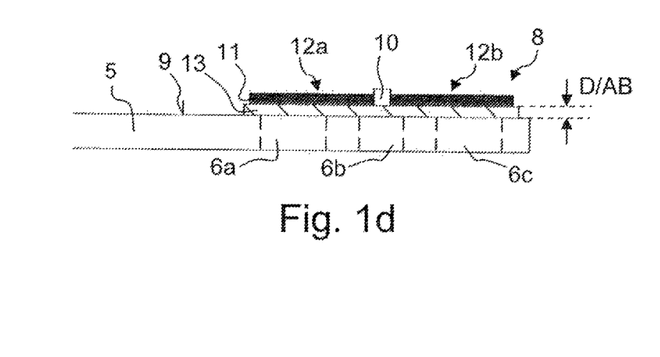
FIG. 1d is a schematic longitudinal section through the knife blade of FIG. 1b in the plane of section Id.

As can be seen in the cross-section of FIG. 1c and the longitudinal section of FIG. 1d, the RFID transponder 8 engages over the perforations 6a, 6b, 6c so that highfrequency radiation can also reach the lower side of the antenna 11 through the tang 5; however, the RFID transponder 8 does not project beyond the tang 5 (that is to say, the tang 5 overlaps the entire length of the RFID transponder 8). In the example shown, the RFID transponder 8 has a planar, layer-like dielectric carrier 13 (typically of plastics material), to which the antenna 11 and the chip 10 are applied (in particular imprinted thereon). The dielectric carrier 13 has a thickness D of typically 2 mm or less. The antenna 11 is electrically insulated from the tang 5 by the dielectric carrier 13; at the same time, the spacing AB which the antenna 11 (or the planar portions 12a, 12b thereof) has from the planar lateral face 9 of the tang 5 arranged in a parallel manner is adjusted.

As a result of the spatial proximity of the tang 5 and the mutual orientation, the antenna 11 can couple well to the tang 5 or the entire knife blade 1 in an inductive and/or capacitive manner. The electromagnetic coupling can be finely adjusted by means of the thickness D and the material of the dielectric carrier 13 (in particular the dielectric constant thereof).

Figure 1E:
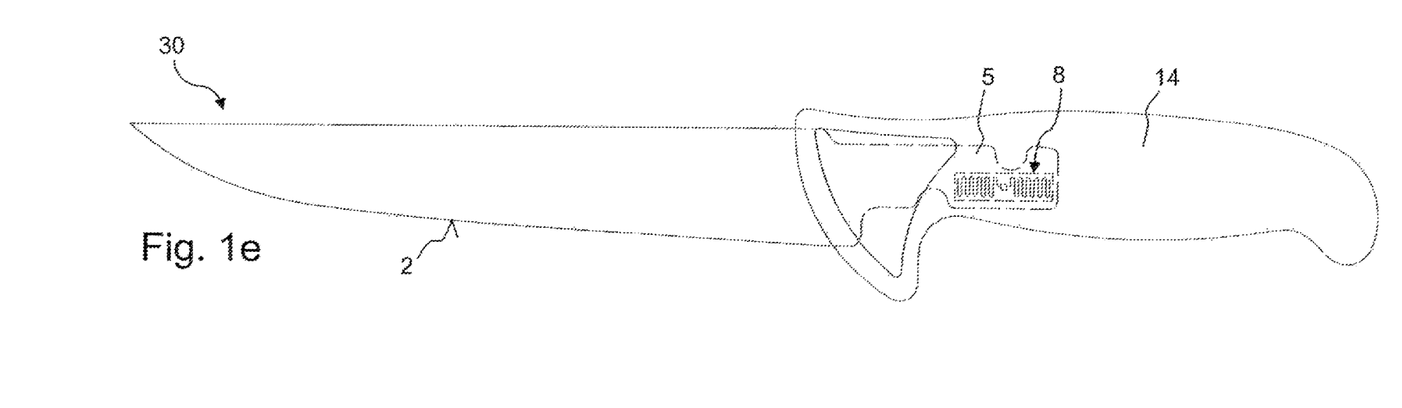
FIG. 1e shows an embodiment of a knife according to the invention, with the knife blade of FIG. 1b and with a cast knife handle.

Finally, as can be seen in FIG. 1e, the tang 5 together with the RFID transponder 8 is overmolded with a plastics material, whereby a knife handle 14 is formed (hidden elements are illustrated with broken lines in this case). As a result, a knife 30 according to the invention is produced. Typically, the knife 30 (or the cutting edge 2 thereof) is subsequently further ground.

Where the subsequent embodiments and variants correspond to the illustrations of FIGS. 1a-1e, this is not mentioned particularly, but instead the differences are particularly explained in greater detail.

Figure 2:
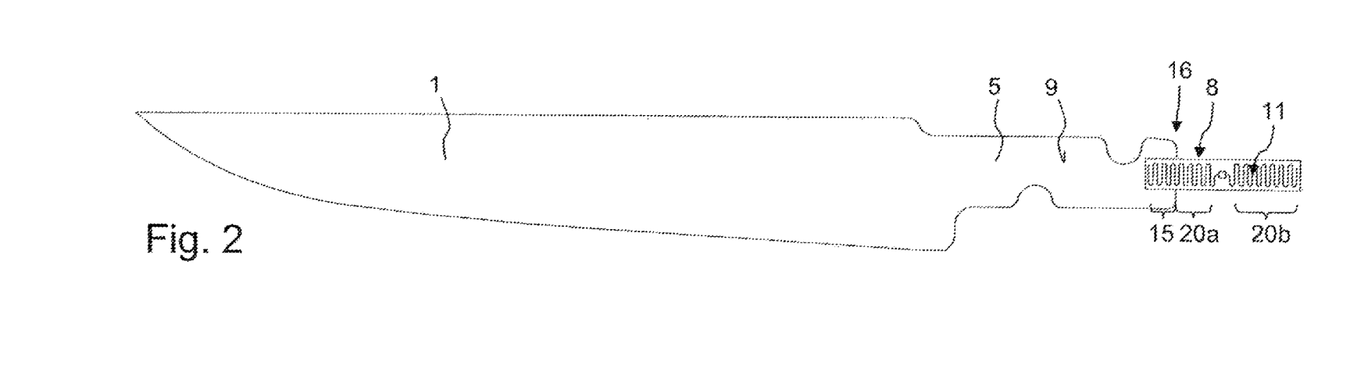
FIG. 2 is a schematic side view of a knife blade with a tang for a knife according to the invention, having an RFID transponder which is fixed to a planar lateral face of the tang and which projects beyond the end of the tang facing away from the cutting edge.

FIG. 2 illustrates a knife blade 1 for the invention, wherein an RFID transponder 8 is fixed to the tang 5 in such a manner that only a first portion 15 of the antenna 11 of the RFID transponder 8 is arranged on a planar lateral face 9 of the tang 5; the remainder of the antenna 11 with the portions 20a, 20b projects beyond the end 16 of the tang 5 facing away from the cutting edge. That remainder of the antenna 11 is thereby accessible in a particularly effective manner for high-frequency radiation of an RFID reading device.

Figure 3A:
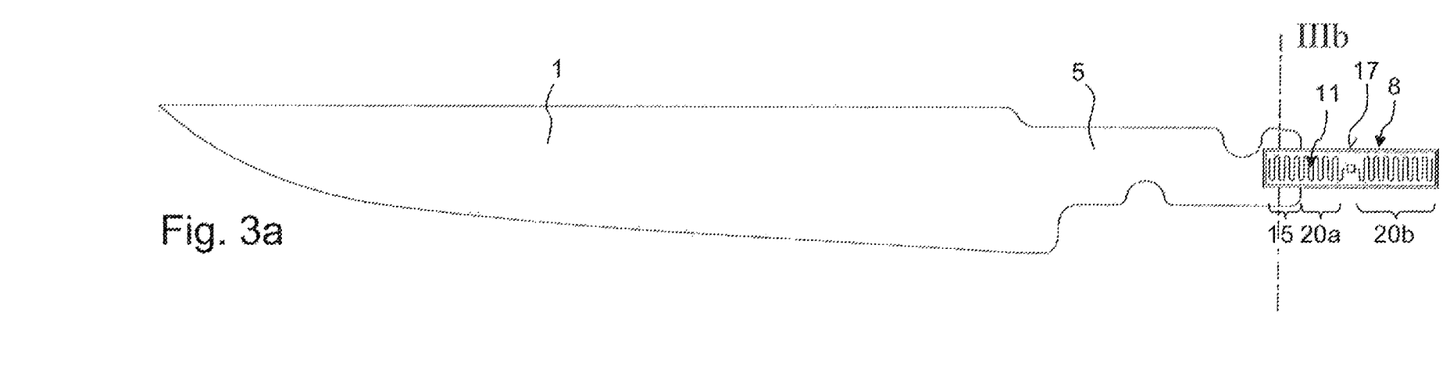
FIG. 3a is a schematic side view of a knife blade with a tang for a knife according to the invention, having an RFID transponder which is fixed to a planar lateral face of the tang and which projects beyond the end of the tang facing away from the cutting edge, wherein the RFID transponder is arranged on an additional metal substrate.

FIG. 3a illustrates another knife blade 1 for the invention. In this case, the RFID transponder 8 also overlaps the tang 5 only with a portion 15 of the antenna 11, and the remainder with the portions 20a, 20b of the antenna 11 projects beyond the tang 5.

Figure 3B:
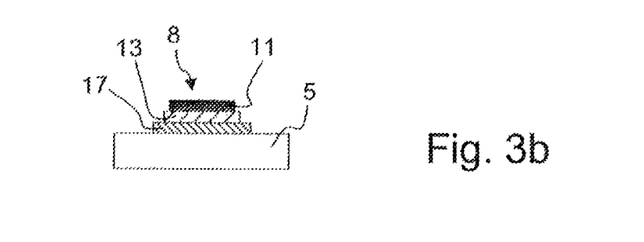
FIG. 3b is a schematic cross-section through the knife blade of FIG. 3a in the plane of section IIIb.

In this instance, however, the RFID transponder 8 is arranged on an additional metal substrate 17 which is arranged between a dielectric carrier 13 and the tang 5, cf. FIG. 3b. The metal substrate 17 is constructed in this instance as a rigid metal plate of sheet steel. The metal substrate 17 engages under the RFID transponder 8 in particular in the region which projects beyond the tang 5 at the other side of the rear end 16, and in this case also in the overlap region with the tang 5. In the example shown, the metal substrate 17 is galvanically connected to the tang 5 because the metal substrate 17 is positioned directly on the tang 5. If desirable, the metal substrate 17 can be soldered on the tang 5.

Figure 4A:
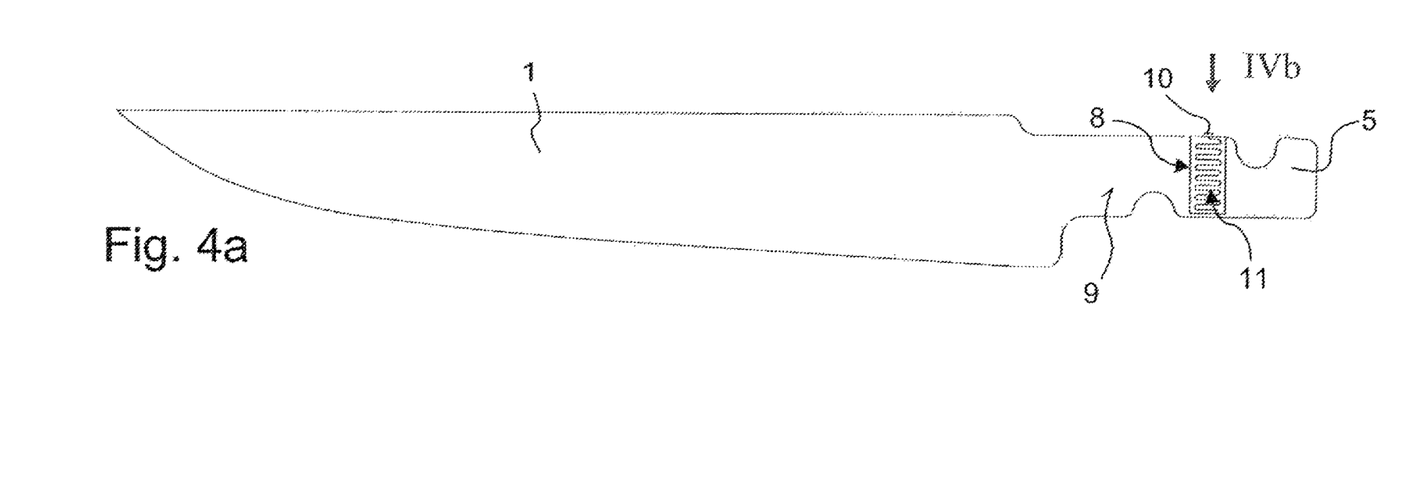
FIG. 4a is a schematic side view of a knife blade with a tang for a knife according to the invention, having an RFID transponder which engages round the tang.

FIG. 4a illustrates a knife blade 1 for the invention, wherein an RFID transponder 8 is positioned in a saddle-like manner on the back of the tang 5 of the knife blade 1.

Figure 4B:
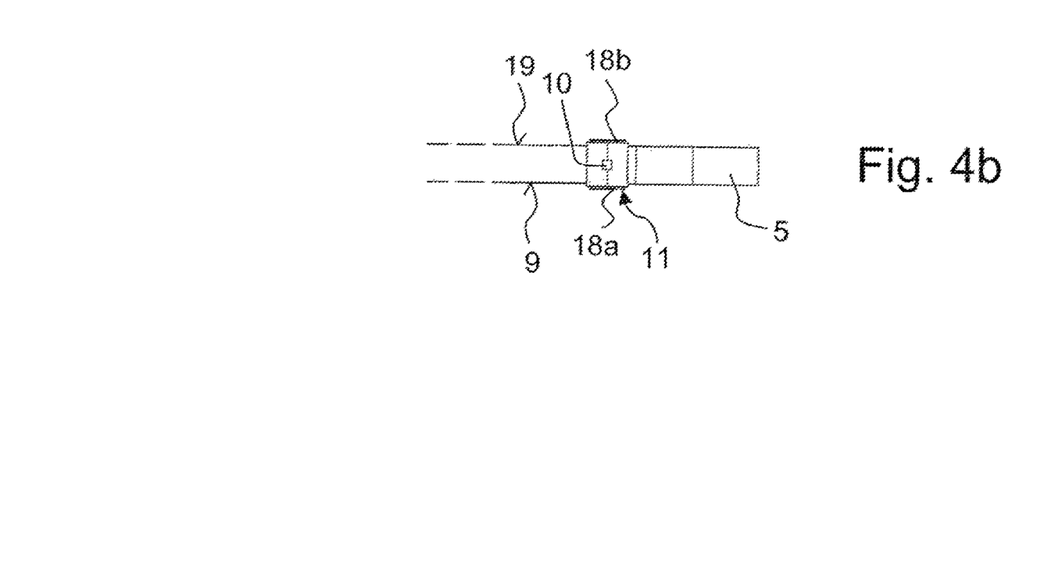
FIG. 4b is a schematic top view of the knife blade of FIG. 4a in the arrow direction IVb.

As can also be seen in the top view of FIG. 4b, a first planar portion 18a of the antenna 11 (at the bottom in FIG. 4b) is arranged on a first planar lateral face 9 of the tang 5 and a second planar portion 18b (at the top in FIG. 4b) of the antenna 11 is arranged on a second planar lateral face 19 of the tang 5, wherein the second lateral face 19 is opposite the first lateral face 9. The chip 10 is positioned centrally on the back of the tang 5 and is connected to the two portions 18a, 18b of the antenna 11 in an electrically conductive manner.

Figures 5A, 5B:
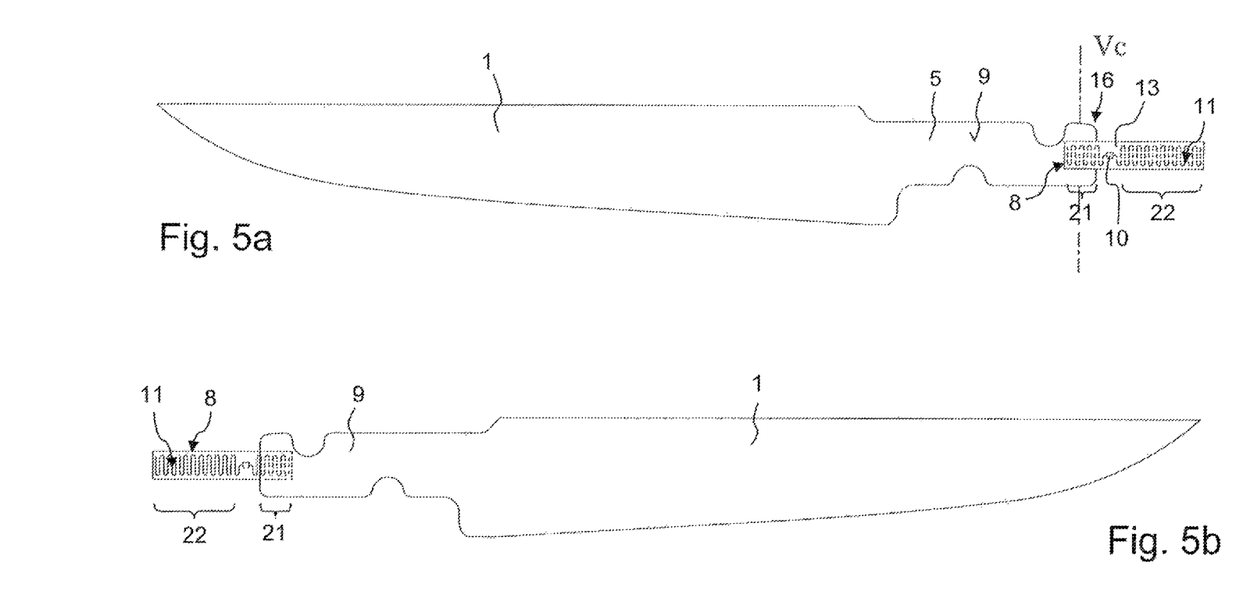
FIG. 5a is a schematic side view of a knife blade with a tang for a knife according to the invention, having an RFID transponder which is fixed to a planar lateral face of the tang and which projects beyond the end of the tang facing away from the blade, with the antenna positioned directly on the tang.
FIG. 5b is a schematic side view of the knife blade of FIG. 5a, when viewed from the opposite side.

FIG. 5a shows a knife blade 1 for the invention, wherein an RFID transponder 8 with a portion (part) 21 of the antenna 11 thereof is directly positioned on the tang 5 and thereby directly produces a galvanic contact between the supported portion 21 and the tang 5. The remaining portion (part) 22 of the antenna 11 projects beyond the tang 5 at the other side of the rear end 16 of the tang 5. Since in FIG. 5a the antenna 11 is hidden by a dielectric carrier 13, the antenna 11 is indicated only with broken lines. The two portions 21, 22 do not have any electrically conductive connection (that is to say, are galvanically separated) but they are both connected to the chip 10 in an electrically conductive manner.

FIG. 5b shows the knife blade 1 from the opposite side to FIG. 5a, wherein the portion (part) 21 of the antenna 11 is hidden by the tang 5 and is therefore again illustrated with broken lines. It should be noted that in this instance the portion 21 of the antenna 11 is constructed to be far shorter than the portion 22 of the antenna 11. As a result of an unequal division of the antenna 11, it can be adapted to a desired frequency (also with regard to the coupling to the tang 5, which is galvanic here).

Figure 5C:
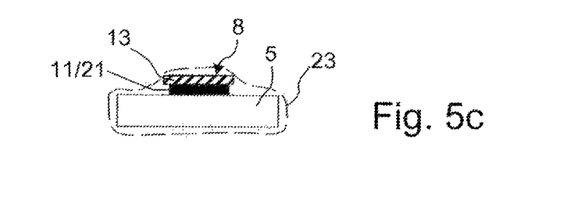
FIG. 5c is a schematic cross-section through the knife blade of FIG. 5a in the plane of section Vc.

FIG. 5c, which is a cross-section through the knife blade 1 in the region of the planar portion (part) 21 of the antenna 11, which portion is positioned on the planar lateral face 9 of the tang 5, shows the direct contact between the antenna 11 and the tang 5; the dielectric carrier 13 on which the antenna 11 is arranged faces away from the tang 5. In order to press the antenna 11 permanently on the tang 5, a ripple-finish paint 23 which is coated around the tang 5 and the RFID transponder 8 in the region of the portion 21 can be used. The ripple-finish paint 23 contracts after heating and is thereby placed under resilient tensile stress, whereby the antenna 11 is urged onto the tang 5. In place of a ripple-finish paint 23, it is also possible to use a jacket made from a heat-shrinkable sleeve which is drawn over the RFID transponder 8 and the tang 5 in the overlap region thereof and heated.

FIGS. 6a to 6d illustrate a variant of a production according to the invention of an embodiment of a knife according to the invention, wherein a galvanic contact is produced between the antenna of an RFID transponder and a tang via a soldering location 24.

Figure 6A:
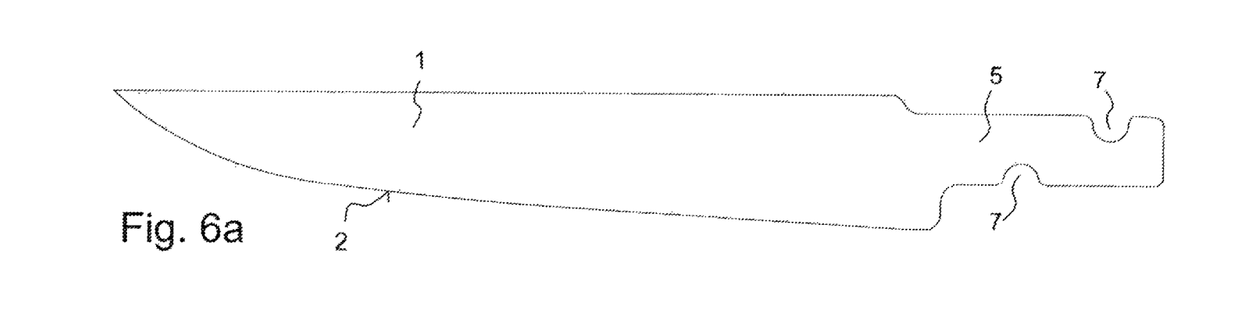
FIG. 6a is a schematic side view of a knife blade with a tang for a knife according to the invention, with the tang being constructed without any perforations.

FIG. 6a first illustrates a knife blade 1 having a cutting edge 2 and a tang 5, with which a knife according to the invention is produced according to the invention. In this instance, the tang 5 has notches 7 for simple machine engagement, but not perforations in this instance.

Figure 6B:
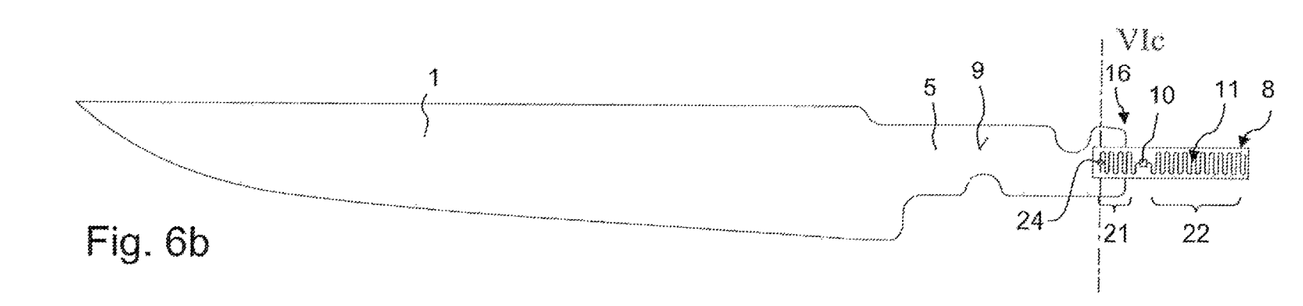
FIG. 6b shows the knife blade from FIG. 6a, with an RFID transponder which is fixed to a planar lateral face of the tang and which projects beyond the end of the tang facing away from the cutting edge, wherein the antenna of the RFID transponder is galvanically connected to the tang by means of a soldering contact through a dielectric carrier.

An RFID transponder 8 is now fitted to the tang 5, cf. FIG. 6b, wherein the region of a planar portion (part) 21 of an antenna 11 of the RFID transponder 8 is arranged and fixed, in particular adhesively bonded, on a planar lateral face 9 of the tang 5. It should be noted that the portion 21 of the antenna 11 has, as a result of a substantially shorter length, a different inductivity and capacitance from the portion (part) 22 which projects with respect to the tang 5 at the other side of the rear end 16 thereof. The portions 21 and 22 of the antenna 11 are galvanically separated from each other (that is to say, not connected to each other in an electrically conductive manner) but both connected to the chip 10 of the RFID transponder 8.

Figure 6C:
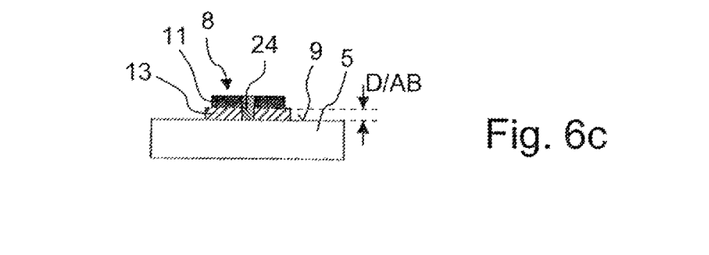
FIG. 6c is a schematic cross-section through the knife blade of FIG. 6b in the plane of section Vc.

A dielectric carrier 13 of the RFID transponder 8 has an opening in which there is arranged a measure of soldering tin which connects as a soldering contact 24 the antenna 11 at the outer end of the portion (part) 21 to the tang 5 in an electrically conductive manner, as can be seen in the cross-section of FIG. 6c. The tang 5 or the entire knife blade 1 thereby effectively extends the portion 21 of the antenna 11. As a result of the overlap of the antenna 11 in the portion 21 with respect to the tang 5, the antenna 11 is also further electromagnetically coupled to the tang 5, which can be used for fine adjustment of the resonances in the RFID transponder 8. In this case, in particular also the thickness D of the dielectric carrier or the spacing AB of the planar antenna portion 21 from the planar lateral face 9 of the tang 5 can be selected in a selective manner.

Figure 6D:
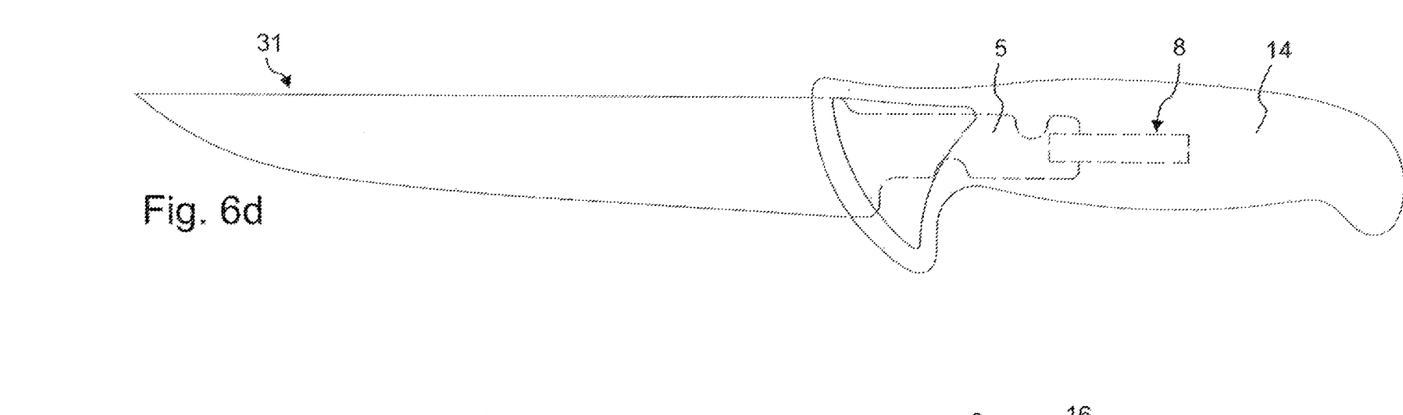
FIG. 6d shows another embodiment of a knife according to the invention, with the knife blade of FIG. 6b, and with a cast knife handle.

The tang 5 together with the RFID transponder 8 is subsequently overmolded with plastics material in order to produce a knife handle 14 for the knife 31 according to the invention, cf. FIG. 6d. The portions covered by the knife handle 14 are again illustrated with broken lines.

Figure 7:
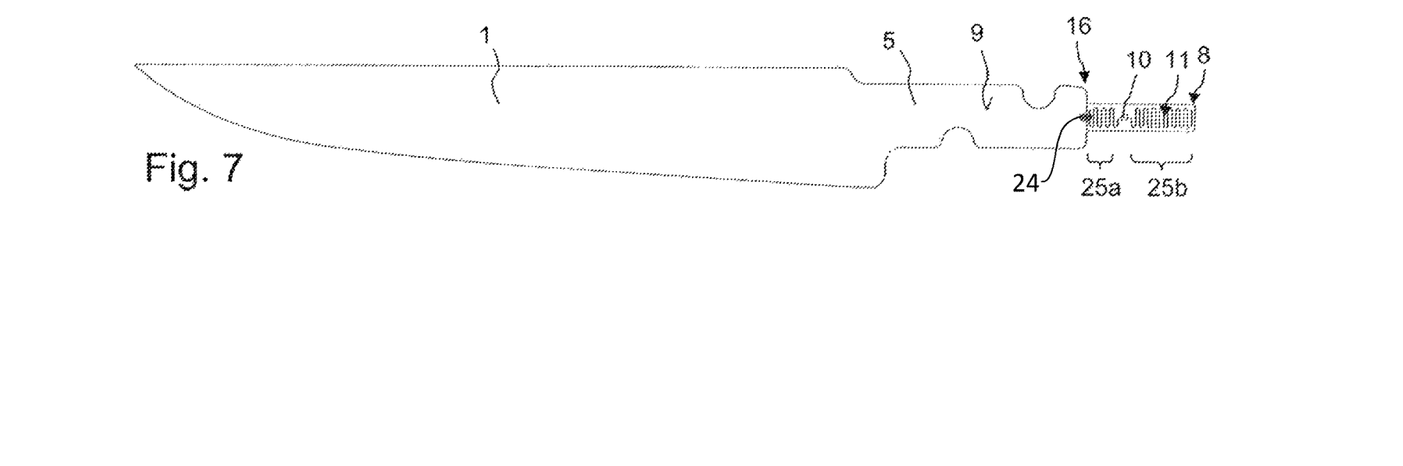
FIG. 7 is a schematic side view of a knife blade with a tang for a knife according to the invention, wherein an RFID transponder is fixed to an end of the tang remote from the cutting edge and the antenna of which is galvanically connected to the tang by means of a soldering contact.

FIG. 7 illustrates a knife blade 1 for the invention, in which the RFID transponder 8 is not fixed to a planar lateral face 9 of the tang 5, but is instead subsequently fixed to the tang 5 at the rear end 16 of the tang 5 facing away from the cutting edge, for example, by adhesive bonding. A galvanic coupling in this instance is achieved with a soldering contact 24 between a front portion (part) 25a of the antenna 11 and the tang 5. The rear longer portion (part) 25b of the antenna 11 is galvanically separated from the front portion 25a, wherein both portions 25a, 25b are, however, electrically connected to the chip 10.

A knife according to the invention may in particular be constructed as a boning knife. Knives according to the invention are in particular used in food product processing facilities, in particular slaughterhouses, and read with RFID reading devices. RFID reading devices can be configured in particular at cleaning stations, disinfection stations, storage stations, room entrances and/or room exits.

What is claimed is:

1. A knife comprising:
  a knife blade having a tang;
  an RFID transponder which is fixed to the tang; and
  a knife handle which surrounds the tang and the RFID transponder;
  wherein the knife blade is produced from steel metal;
  wherein the RFID transponder has an antenna and at least a portion of the antenna of the RFID transponder is constructed in a planar manner and is arranged parallel with a planar lateral face of the tang;
  wherein the tang has one or more perforations which are engaged over by the antenna of the RFID transponder.

2. The knife according to claim 1, wherein the at least one planar portion of the antenna which is arranged parallel with the planar lateral face of the tang is arranged in front of the planar lateral face with a spacing of a maximum of 2 mm.

3. The knife according to claim 1, wherein the at least one planar portion of the antenna which is arranged parallel with the planar lateral face of the tang is arranged in front of the planar lateral face with a spacing of a maximum of 1 mm.

4. The knife according to claim 1, wherein all the portions of the antenna of the RFID transponder are constructed in the planar manner and arranged parallel with the planar lateral face of the tang.

5. The knife according to claim 4, wherein the antenna of the RFID transponder has two mutually galvanically separated antenna portions wherein the two portions of the antenna are arranged at mutually opposing planar lateral faces of the tang.

6. The knife according to claim 4, wherein the antenna of the RFID transponder has two mutually galvanically separated antenna portions wherein all the portions of the antenna are arranged at the same planar lateral face of the tang.

7. The knife according to claim 1, wherein at least a portion of the antenna of the RFID transponder projects beyond a rear end of the tang facing away from a cutting edge of the knife blade.

8. The knife according to claim 1, including a dielectric carrier disposed between at least a portion of the antenna and a portion of the tang.

9. The knife according to claim 8, including an additional metal substrate, the additional metal substrate being a metal foil or a metal plate, wherein the additional metal substrate is disposed between at least a portion of the dielectric carrier and a portion of the tang.

10. The knife according to claim 9, wherein the additional metal substrate engages under a portion of the antenna which projects beyond the tang.

11. The knife according to claim 9, wherein the additional metal substrate is galvanically connected to the tang.

12. A knife comprising:
  a knife blade having a tang;
  an RFID transponder which is fixed to the tang; and
  a knife handle which surrounds the tang and the RFID transponder;
  wherein the knife blade is produced from steel metal;
  wherein the RFID transponder has an antenna and the antenna of the RFID transponder is galvanically connected to the tang.

13. The knife according to claim 2, wherein the antenna of the RFID transponder has two mutually galvanically separated antenna portions, and only one of the antenna portions is galvanically connected to the tang, and wherein the antenna portions have a different capacitance and/or inductivity.

14. The knife according to claim 2, wherein at least a portion of the antenna of the RFID transponder is constructed in a planar manner and is arranged parallel with a planar lateral face of the tang.

15. A method for producing a knife according to claim 1, the method comprising the steps of:
   a) fixing the RFID transponder to the tang, wherein the at least a planar portion of the antenna of the RFID transponder is arranged parallel with the planar lateral face of the tang; and
   b) producing the knife handle by the tang and the RFID transponder being overmolded or cast-in with a plastics material using an injection-molding method.

16. The method according to claim 15, including the step of adhesively bonding the RFID transponder to the tang.

17. A method for producing a knife according to claim 12, the method comprising the steps of:
   a) fixing the RFID transponder to the tang, wherein the antenna of the RFID transponder is galvanically connected to the tang; and
   b) producing the knife handle by the tang and the RFID transponder being overmolded or cast-in with a plastics material using an injection-molding method.

18. The method according to claim 17, including the step producing a soldering contact between the antenna and the tang.

19. The method according to claim 17, including the step placing the antenna directly on the tang and then of applying and heating a ripple-finish paint or a heat-shrinkable sleeve which surrounds a portion of the antenna and the tang which presses the antenna and tang together.

20. A knife comprising:
a knife blade having a tang;
an RFID transponder which is fixed to the tang; and
a knife handle which surrounds the tang and the RFID transponder;
wherein the knife blade is produced from steel metal;
wherein the RFID transponder has an antenna and at least a portion of the antenna of the RFID transponder is constructed in a planar manner and is arranged parallel with a planar lateral face of the tang;
wherein at least a portion of the antenna of the RFID transponder projects beyond a rear end of the tang facing away from a cutting edge of the knife blade.

21. A knife comprising:
a knife blade having a tang;
an RFID transponder which is fixed to the tang; and
a knife handle which surrounds the tang and the RFID transponder;
wherein the knife blade is produced from steel metal;
wherein the RFID transponder has an antenna and at least a portion of the antenna of the RFID transponder is constructed in a planar manner and is arranged parallel with a planar lateral face of the tang;
wherein the at least one planar portion of the antenna which is arranged parallel with the planar lateral face of the tang is arranged in front of the planar lateral face with a spacing of a maximum of 2 mm;
wherein the antenna of the RFID transponder has two mutually galvanically separated antenna portions, and only one of the antenna portions is galvanically connected to the tang, and wherein the antenna portions have a different capacitance and/or inductivity.

* * * * *